United States Patent Office 3,554,995
Patented Jan. 12, 1971

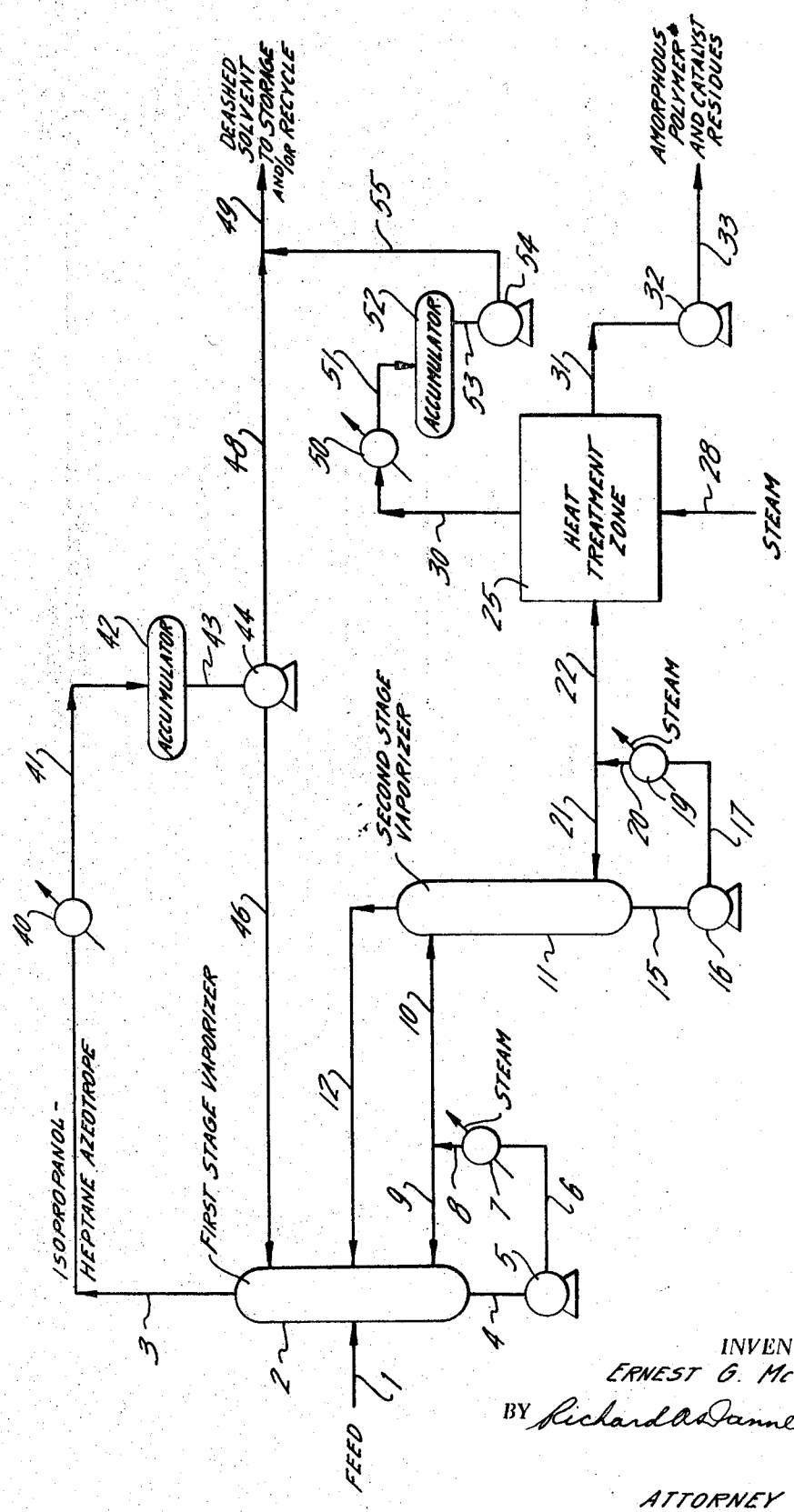

3,554,995
DEASHING SOLVENT RECOVERY PROCESS
Ernest G. McCray, Odessa, Tex., assignor to Dart Industries Inc., Los Angeles, Calif., a corporation of Delaware
Filed Jan. 23, 1969, Ser. No. 793,417
Int. Cl. C08f *3/08, 47/24*
U.S. Cl. 260—93.7                              3 Claims

ABSTRACT OF THE DISCLOSURE

The improvement in a process for recovering deashing solvent from a mixture of a solvent containing catalyst and polymeric residues comprises separating bottoms recovered from a vaporization system in a heat treatment zone in the absence of flux medium at temperatures of above about 300° F. with agitation into residue and solvent, removing the residue to storage and recovering from the zone the solvent which contains substantially all of the solvent in the bottoms fed to the zone. The residue contains a predominant amount of amorphous polymeric materials which is of commercial value.

BACKGROUND OF THE INVENTION (1) Field of the invention

This invention relates to an improved process for recovering solvent compositions contaminated with extraction residues derived from a deashing operation of an alpha-olefin polymer. More particularly it relates to recovering substantially all of the solvent used to deash, for example, polypropylene and removing therefrom a residue containing polymerization catalyst residues and amorphous polypropylene.

(2) Description of the prior art

In various polymerization processes for the synthesis of polyethylene, polypropylene and higher alpha-olefin polymeric compounds, the reaction products contain low molecular weight amorphous polymeric materials and metallic residues from the organometallic catalysts used in the process. These materials and residues are usually extracted from the solid polymeric products by what is now a well known deashing operation, whether in one step or a series of steps. Liquid solvents are employed for these extraction processes and they become contaminated with extracted residues. Large amounts of solvents are cycled in operations of this type so that it is very important to recover substantially all of the solvents for reuse in the deashing operations.

Prior art processes for recovering solvent for reuse in deashing operations have heretofore found it necessary to use as a flux medium a high boiling hydrocarbon oil having a high boiling point in the last stage of separation. These processes include the steps of heating the hydrocarbon oil to temperatures above 200° F. and contacting therewith a stream of the volatile treating agent or solvent mixture containing the polymeric materials and catalyst residues usually after the solvent mixture has a concentration ranging from about 20 to 65 weight percent. The heated hydrocarbon oil is the medium used to lower the viscosity of the solvent mixture at these high levels of concentration and to heat the solution to promote vaporization of the volatile components from the mixture. Details of these prior art methods can be found by referring to U.S. Pats. 3,311,-545 and 3,360,444 and 3,400,053. It has been found that the use of such hydrocarbon flux oils has certain disadvantages. One such disadvantage is the possibility of contaminating the solvent recovered from the overhead of the vaporization system by the hydrocarbon oil. Another disadvantage is the additional facilities required to handle the flux oil. If such equipment were eliminated from the vessel requirements of a given deashing plant it would greatly reduce the cost of the plant. Still another disadvantage with the use of flux oil is the problem of disposing of the residue-containing flux oil after the solvent is recovered, i.e., by burning the oil in incinerators. It would be greatly advantageous if a process were available in which deashing solvents could be easily separated from the residue and recovered without the necessity of employing hydrocarbon flux oils.

SUMMARY

Accordingly, it is an object of the present invention to provide a process for recovering deashing solvents from contaminated streams thereof containing mixtures of polymeric materials and catalyst residues without the use of a flux hydrocarbon oil.

Another object of this invention is to provide a process for separating solvents from the contaminated solvent streams containing amorphous polymeric materials and catalyst residues resulting from the deashing of alpha-olefin polymeric products and recovering the solvent and residues in the absence of flux oil.

These and other objects of this invention will become apparent from the description of the invention below.

The present invention provides an improvement in a process for recovering a solvent employed in a deashing operation to extract a mixture of catalyst and low molecular weight polymeric residues from an alpha-olefin polymer which comprises concentrating the mixture in the solvent contaminated with the residues in a vaporization system. The improvement in the process comprises:

(a) separating the bottoms from the vaporization system in a heat treatment zone in the absence of a flux medium at a temperature of above about 300° F. with agitation into a residue stream and a solvent stream, (b) removing the residue stream from the heat treatment zone, and (c) recovering from the heat treatment zone the solvent steam containing substantially all of the solvent remaining in the bottoms from the vaporization system.

The mixture of residues in the contaminated solvent is concentrated so that the bottoms from the vaporization system has a total solids content of at least 10 weight percent. The residue removed from the heat treatment zone contains a predominant amount of amorphous polymeric material which because it is not contaminated with flux oil can be sold directly to manufacturers of such materials as adhesives, liners, binders, and coatings without further processing.

BRIEF DESCRIPTION OF THE DRAWING

The present invention will be more readily understood and further objects and advantages will be more apparent when read in conjunction with the accompanying drawing which is a process flow diagram of units and flow paths suitable for carrying out the process of this invention.

PREFERRED EMBODIMENTS OF THIS INVENTION

In a preferred embodiment of this invention, the bottoms from the last stage of a multiple-stage vaporization system are fed to a heat treatment zone and heated therein in the absence of a flux medium to a temperature of above about 300° F. with agitation and are separated into a residue stream and a solvent stream. The residue stream containing a predominant amount of amorphous polymeric materials is removed to storage and the solvent stream which consists essentially of substantially all of the solvent remaining in the bottoms fed to the zone is recovered from the heat treatment zone. The bottoms fed to the heat treatment zone preferably contain at least 20 weight percent solids.

The contaminated solvent which is treated in accordance with the process of this invention as discussed above comprises the solution of filtrate recovered after the deashing and separation of the alpha-olefin polymers. The feed will contain a major proportion of the treating agents or solvents, solubilized metallic impurities and inorganic and organic solids. The metallic impurities and inorganic and organic solids are the so-called catalyst residues which have been separated from the polymeric products by treatment with the solvents. The polymerization catalysts, from which these residues are derived, include those which have been employed in the prior art processes to prepare, for example, polypropylene and copolymers of polypropylene with minor amounts of other alpha-olefins. Detailed lists of operable heavy organometallic catalysts are set forth in U.S. Pats. 2,962,488 and 3,012,023. The preferred catalysts are prepared from alkyl aluminum compounds such as dialkyl aluminum monohalides, triethyl aluminum, triisobutyl aluminum or trioctyl aluminum with a titanium or zirconium compound such as the tetrachloride or trichloride. However, the exact composition of the catalyst residues in the feed to the heat treatment zone is not critical to the process of this invention.

The solvents used to deash the polymer include hydroxyl-containing compounds including water and alkanols having from about 1–8 or more carbon atoms per molecule. Examples of such alkanols include methanol, ethanol, propanol, isopropanol, n-butanol, isobutanol, pentanols, hexanols, heptanols, octanols, etc. and mixtures of these alkanols. These solvents commonly contain mixtures of the hydroxy-containing compounds with hydrocarbons such as aliphatic normally liquid paraffins. Polyhydroxy compounds such as glycols including ethylene and polyethylene glycols and glycerine have also been found to be useful. Examples of the hydrocarbons include xylenes, toluene, benzene, pentane, hexane, heptane, isooctane, decane, Decalin, mixtures thereof, as well as liquified normally gaseous $C_3$ to $C_4$ hydrocarbons. It has been found that an effective solvent for the removal of catalyst residues and low molecular weight waxy or atactic polypropylene reaction products is a combination of isopropanol and n-heptane azeotropes. Compositions approaching azeotropes of these two materials have been found to be particularly useful deashing solvents.

Referring now to the drawing, a feed comprising an azeotrope of isopropanol and n-heptane, crystalline and amorphous polypropylene and catalyst residues comprising titanium trichloride and diethyl aluminum chloride was passed through line 1 to first-stage vaporizer 2. First-stage vaporizer 2 is ordinarily maintained at a pressure of from 1 through 25 p.s.i.a. and at a temperature of 170° to 195° F. In this vaporizer, a major proportion of the isopropanol-heptane azeotrope, i.e., above 50% of the solvent present in the vaporizer and up to about 98% is recovered overhead by line 3. The residue from first-stage vaporizer 2 is removed via line 4 and pump 5 to line 6. The residue in line 6 is recirculated through reboiler 7 and through line 8. A portion of the residue in line 8 is taken by line 9 to vaporizer 2. The remainder of the residue in line 8 is taken by line 10 to second-stage vaporizer 11. In second-stage vaporizer 11 which is maintained at a pressure of from about 1–25 p.s.i.g. and a temperature of from 170° to 210° F., there is further recovered a major proportion of the isopropanol-heptane azeotrope, that is, above about 40% of the azeotrope present in vaporizer 11 up to 95%, overhead via line 12. The residue from second-stage vaporizer 11 now has been concentrated from about 1% polymeric materials and catalyst residues in the azeotrope to above about 40% solids in the bottoms leaving second-stage vaporizer 11. This second-stage vaporizer residue is taken via line 15 and through pump 16 to line 17. The residue in line 17 is passed through reboiler 19 and line 20. A portion of the residue in line 20 is recirculated via line 21 to second-stage vaporizer 11. The remainder of the residue in line 20 is fed via line 22 to heat treatment zone 25. Heat treatment zone 25 is designed to separate the solvent from the polymeric and catalyst residues at temperatures of above about 300° F., preferably above about 300° to 400° F. At these temperatures the polymeric and catalyst residues are fluid enough to pump. Heat treatment zone 25 can be a stirred vessel in which the bottoms in line 22 are heated to the desired temperature to remove the solvent while the bottoms containing the mixture of polymeric and catalyst residues are agitated to increase heat and mass transfer. Steam is supplied as the heating medium for heat treatment zone 25 via line 28. It is preferred to operate the heat treatment zone at less than atmospheric pressure and more preferably under a reduced pressure of about 50 to 200 mm. Hg to improve solvent recovery using standard equipment (not shown). The polymeric and catalyst solid residues which are substantially free of solvent are withdrawn from heat treatment zone 25 through line 31 and pumped via pump 32 through line 33 to storage. The residue in line 33 consists essentially of a predominant amount of amorphous polypropylene, a minor amount, i.e., less than about 15% of crystalline polypropylene and a minor amount, i.e., less than 10%, of catalyst residues, all based on the weight of the residue. This residue can be disposed of in a number of ways. Preferably the residue because of its high content of amorphous polypropylene has commercial value as enumerated above and is therefore passed to storage.

The overhead comprising an isopropanol-heptane azeotrope from first-stage vaporizer 2 is passed via line 3 through condenser 40, line 41 to accumulator 42. From accumulator 42, the azeotrope can be withdrawn via line 43 and pump 44, a portion of which is recycled to first-stage vaporizer 2 via line 46 and the remainder is taken via line 48 and 49 for further processing or recycled back to the deashing operations (not shown). Similarly the overhead comprising the azeotrope from second-stage vaporizer 11 is recycled via line 12 to first stage vaporizer 2. Alternatively, the azeotropic overhead can be processed in a separate condenser and accumulator (not shown).

All of the vessels and auxiliary equipment illustrated in the drawing are of standard type and commercially available. Thus, the first-stage vaporizer can contain valve trays or similar mass transfer devices, while the second-stage vaporizer need not be equipped with such devices. As indicated above, the heat treatment zone can be a stirred vessel with provisions for maintaining the contents of the vessel in the desired temperature range, i.e., by employing a heating jacket or heating coils. As indicated above, steam enters heat treatment zone 25 via line 28 to supply the heating medium for this purpose. A particularly preferred heat treatment zone for carrying out the present improvement as set forth in the examples include a heated screw conveyor such as the commercially available "Holo-Flite" processor which has internally heated screw flights.

While certain preferred temperatures and pressures have been indicated above for suitable operation of the process herein as applied to the vaporizers, the function of these units is simply to concentrate the feed from approximately less than 1 percent by weight of the solid contaminants to at least 10 percent, preferably 20 percent and still more preferably 40 percent solids before entering the heat treatment zone. It is intended to be within the scope of the process of this invention that the pressures and temperatures can be above or below those noted above or even partial vacuum conditions and lower temperatures can be employed so long as the desired concentration of the solids in the solvents is accomplished. The function of the reboiler units as well as the accumulators is well understood in the art and henceforth requires no further comment.

The efficiency and advantages of the process of this invention for recovering solvent are set forth in the examples below:

EXAMPLES

A feed stream consisting essentially of about 98.5 to 99.0% isopropanol-heptane in a substantially azeotropic combination was introduced through line 1 to first-stage vaporizer 2. The remainder of the feed stream consisted of from about 1 to 1.5% impurities including a majority of amorphous polypropylene, minor amounts of crystalline polypropylene and catalyst residues and extremely small amounts of other contaminants. The overhead in line 3 from vaporizer 2 contained from 91 to 93% of the total azeotrope in the feed to vaporizer 2, leaving 7 to 9% of this azeotrope in the vaporizer 2 bottoms. The bottoms material was conveyed via line 4, pump 5 and line 6 through reboiler 7 to line 8. A portion of the bottoms in line 8 was recycled to vaporizer 2 to maintain the temperature in this vessel at about 193° F. First-stage vaporizer 2 was maintained at a pressure of 23 p.s.i.a. The remaining portion of the bottoms in line 8 which contained about 90% isopropanol-heptane azeotrope and about 10% impurities was passed via line 10 to second-stage vaporizer 11. About 89 to 91% of the total azeotrope mixture in feed to vaporizer 11 was withdrawn overhead via line 12 to vaporizer 2, leaving about 9 to 11% of this solvent mixture in the vaporizer 11 bottoms. The vaporizer 11 bottoms were conveyed via line 15, pump 16 and line 17 through reboiler 19 to line 20. A portion of the bottoms in line 20 was recycled via line 21 to maintain the temperature in this vessel at about 195° F. The same pressure was maintained in vaporizer 11 that was maintained in vaporizer 2. The remaining portion of the bottoms in line 20 contained the azeotrope in an amount ranging from 44 to 50.5% and impurities in an amount ranging from 49.5 to 56% for runs 1 and 2 as indicated in the table below. This bottoms portion was passed via line 22 to heat treatment zone 25.

The heat treatment zone 25 consisted of a heated screw conveyor which is commercially available under the trade name "Holo-Flite" processor. The processor consisted of two intermeshing screws operating in a jacketed and covered trough. The two screws slowly turn counter to one another while gently agitating the mixture of the impurities and solvent. The steam in line 28 was circulated through the hollow shaft and screws of the processor to provide the necessary heat to evaporate the solvent and to heat and melt the solid polymeric and catalyst impurities. Steam was also circulated through the heating jacket to reduce the heat loss from the processor. A nitrogen purge was used to sweep the solvent vapors through processor, although it is more preferable to place zone 25 under a reduced pressure to aid in the removal of these solvent vapors. The solvent from the processor of zone 25 was taken through line 30, condensed in condenser 50 and passed through line 51 into accumulator 52. The accumulated solvent was then taken via line 53, pump 54 and line 55 to join the accumulated solvent from the two-stage vaporizer system. The molten residue of polymeric and catalyst impurities was removed through an outlet valve on the side of the trough of the processor and collected via line 31, pump 32 and line 33 into storage drums. The screw speed was maintained as high as possible, i.e., in the range of about 2 to 3.5 r.p.m. The molten residue from zone 25 was collected at temperatures in the range of about 300 to 325° F. as indicated in the table below. Samples of the residue recovered from line 33 were measured for solvent content and ranged from about 0.2 to 3% solvent as indicated in the table below. The other components making up the residue consisted of about 85% amorphous polypropylene, about 10% crystalline polypropylene and about 5% catalyst impurities, each amount being based on the weight of the residue excluding solvent.

TABLE I

| Run: | Percent solvent in feed to heat treatment zone | Exit temperature of residue, ° F. | Percent solvent in residue from heat treatment zone |
|---|---|---|---|
| 1A | 44 | 300 | 3.2 |
| 1B | 44 | 300 | 3.3 |
| 2A | 50.5 | 300 | 2.6 |
| 2B | 50.5 | 304 | 0.7 |
| 2C | 50.5 | 310 | 0.2 |
| 2D | 50.5 | 320 | 0.8 |
| 2E | 50.5 | 325 | 0.2 |

The above table indicates that the percent solvent that remains in the residue from the heat treatment zone is a function of the exit temperatures of the residue. It can be seen that as long as the exit temperature of the residue was maintained above 300° F., the amount of solvent in the residue was found to be less than 1%. This is highly desirable not only from the standpoint of recovering greater amounts of solvent from the contaminated mixture but from the standpoint of greatly reducing the amount of volatiles remaining in the resulting mass of impurities which makes it more commercially acceptable for the applications indicated above.

While it has been stated herein that it is preferred to operate a deashing system employing an isopropanol-heptane combination, other alcohol-hydrocarbon azeotropes are also encompassed within this preferred embodiment. Thus, azeotropic compositions of alcohols and normally liquid hydrocarbons boiling at a temperature range from about 150° to 300° F. are suitable. Such azeotropic combinations can consist, for example, of isooctane and any one of the following: ethanol, propanol, isobutanol or isopropanol. Toluene and any of the cited alcohols above can also be employed and even xylene with any of the same alcohols. Thus, an azeotropic combination of isooctane (47%) and ethanol (53%) has an azeotropic boiling point of about 162° F.; heptane (49.5%) and isopropanol (50.5%) has an azeotropic boiling point of about 170° F. and m-xylene (14%) and isobutanol (86%) has an azeotropic boiling point of about 227° F. The minimum temperature, therefore, that should be employed in any of the vaporizers should be that corresponding to the azeotropic boiling point of the particular alcohol-hydrocarbon composition.

While only specific embodiments of the process improvements of this invention have been described herein, many other modifications can be made to them without departing from the spirit of the invention. All such modifications that fall within the scope of the appended claims are intended to be embraced thereby.

What is claimed is:

1. In a process for recovering a solvent having a boiling point of no greater than 300° F. employed in a deashing operation to extract a mixture of catalysts and low molecular weight amorphous polypropylene from polypropylene comprising concentrating the solvent contaminated with said mixture in a vaporization system to a total solids content of at least 20 weight percent and recovering said solvent from the overhead of said vaporization system, the improvement in said process which comprises:
   (a) continuously agitating the bottoms containing at least 20 weight percent solids from said vaporization system in a heat treatment zone comprising a hollow agitator through which heating media is circulated while heating said bottoms therein in the absence of a flux medium to a temperature of above about 300° F. to a maximum of 400° F.,
   (b) separating the bottoms in said heat treatment zone into said mixture and a solvent stream, (c) removing to storage said mixture containing less than 1 percent of the solvent stream based on the total weight of the residue stream, and (d) recovering from said heat treatment zone the solvent stream containing substantially all of the solvent remaining in the bottoms fed to said zones.

2. The process of claim 1 wherein said mixture contains greater than 75% amorphous polypropylene based on the total weight of the said mixture.

3. The process of claim 1 wherein said bottoms contain a total solids content of at least 40 weight percent.

References Cited

UNITED STATES PATENTS

| 3,311,545 | 3/1967 | Rasmussen | 203—41 |
| 3,360,444 | 12/1967 | Leibson et al. | 203—41 |
| 3,400,053 | 9/1968 | McBeth | 203—69 |

JOSEPH L. SCHOFER, Primary Examiner

S. M. LEVIN, Assistant Examiner

U.S. Cl. X.R.

260—88.2, 94.9